Oct. 2, 1928.  
H. CURNICK ET AL  
1,686,267  
MOTOR VEHICLE SIGNAL MEANS  
Filed April 7, 1926   2 Sheets-Sheet 1
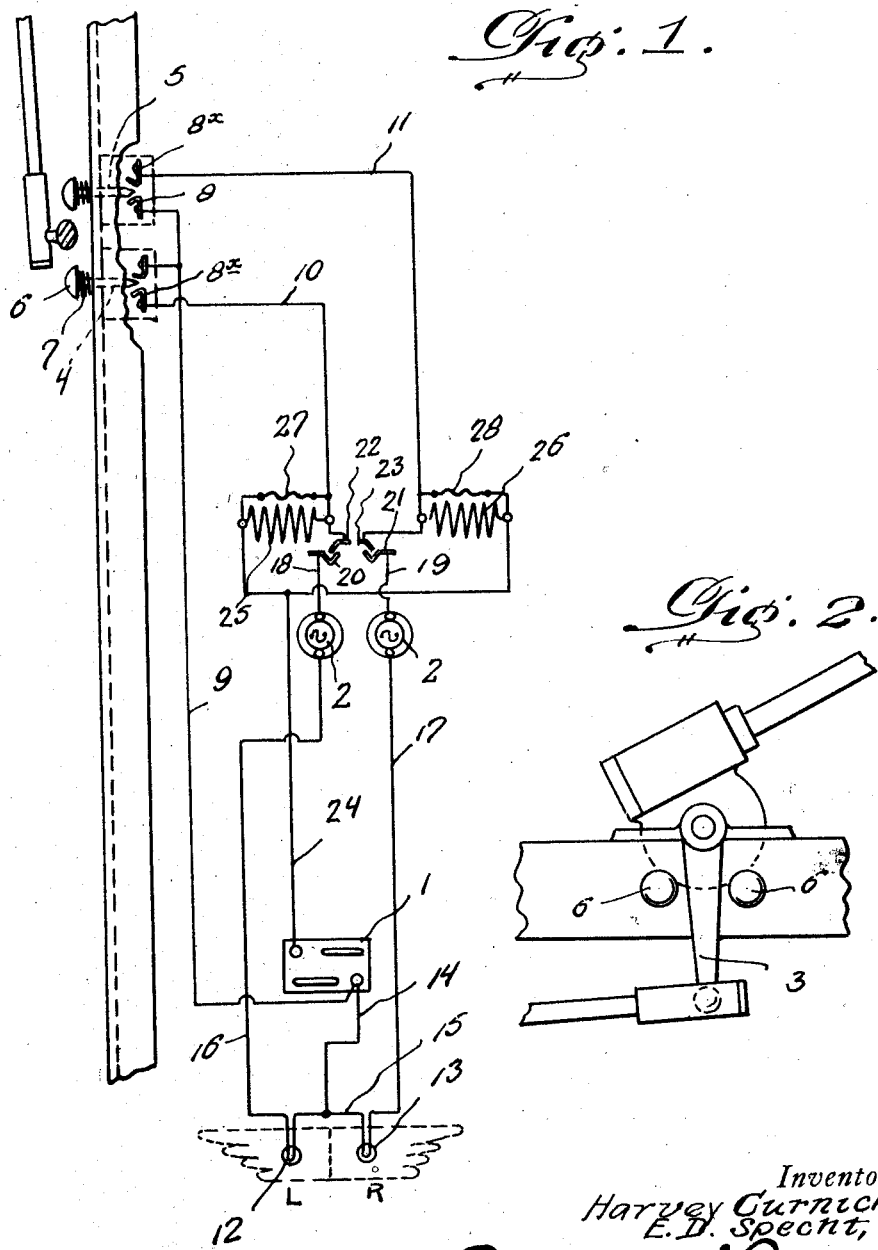
Inventors  
Harvey Curnick,  
E. D. Specht,  
By Clarence A. O'Brien  
Attorney Oct. 2, 1928.
H. CURNICK ET AL
1,686,267
MOTOR VEHICLE SIGNAL MEANS
Filed April 7, 1926    2 Sheets-Sheet 2
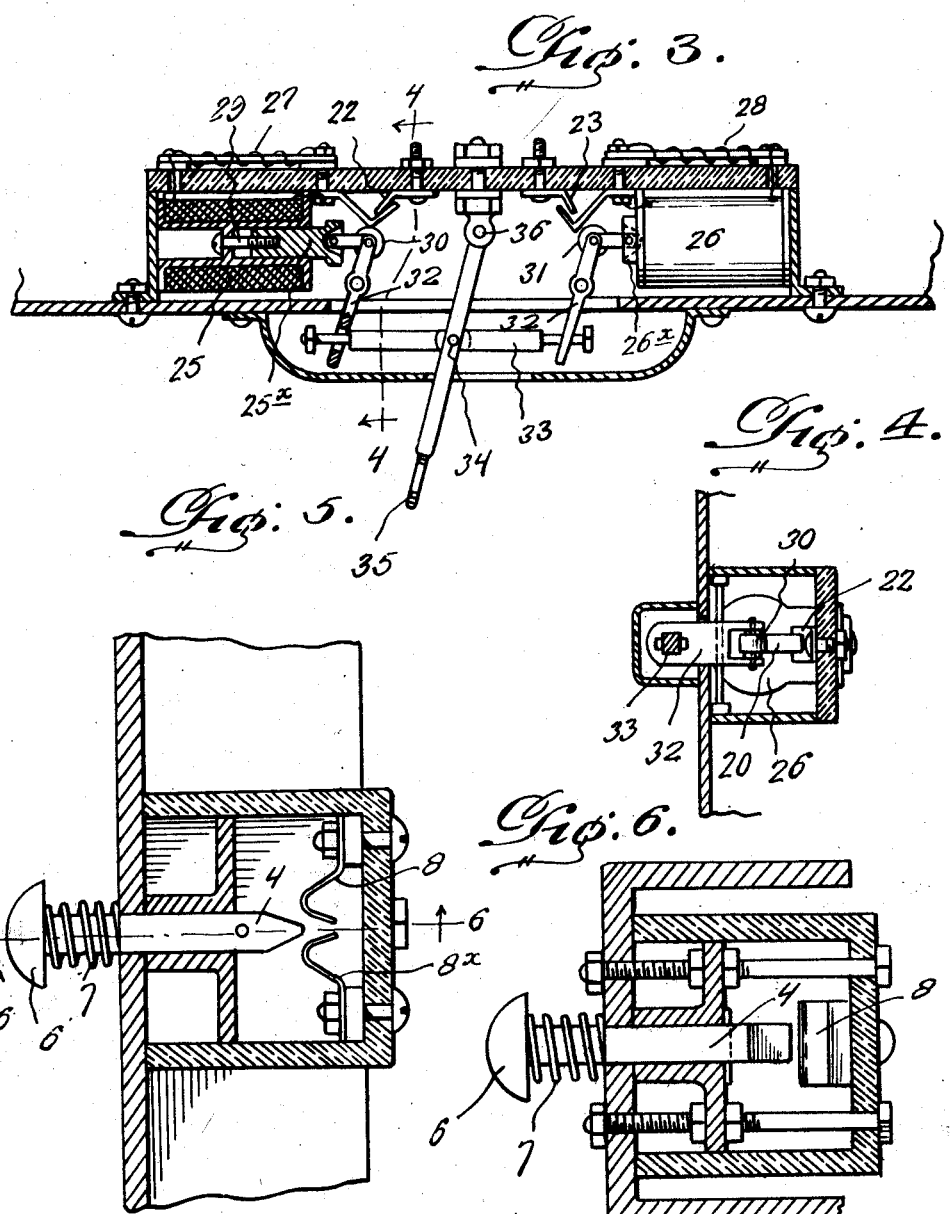

Patented Oct. 2, 1928.

1,686,267

UNITED STATES PATENT OFFICE.

HARVEY CURNICK AND ELSIE D. SPECHT, OF MINNEAPOLIS, MINNESOTA.

MOTOR-VEHICLE SIGNAL MEANS.

Application filed April 7, 1926, Serial No. 100,344. Renewed June 21, 1928.

The object of our said invention is the provision of an electric signal organization through the medium of which a motorist may apprise others, of his intentions with respect to right and left turn, and in the operation of which the lamp caused to glow precedent to the making of a turn, is automatically extinguished incident to the making of said turn.

To the attainment of the foregoing, the invention in all of its details consists in the improvement as hereinafter described and definitely claimed.

In the accompanying drawings, forming part of this specification:—

Figure 1 is a view diagrammatic in character illustrating the preferred embodiment of our invention.

Figure 2 is an elevation, fragmentary in character and showing the steering arm of an automobile and the parts of our improvement adjacent to said arm.

Figure 3 is an enlarged horizontal section, partly in elevation, showing the manually operable switch of our improvement.

Figure 4 is a section on the line 4—4 of Figure 3.

Figures 5 and 6 are enlarged sections showing one of the parts of our improvement for cooperation with the steering arm of the motor vehicle, Figure 6 being taken in the plane indicated by the line 6—6 of Figure 5.

Similar numerals of reference designate corresponding parts in all of the views of the drawings.

We show in Figure 1 a source of electric energy 1, and we also show in said figure tell tale incandescent electric lamps 2, which are preferably, though not necessarily, employed as part of our improvement, the said lamps 2 being designed to be arranged upon the instrument board or any other convenient part of a motor vehicle.

In Figures 2, 1 and 4 to 6, we show the parts of our improvement designed to be employed adjacent to the swingable arm 3 comprised in the conventional means for steering a motor vehicle. The improvement parts just alluded to comprise plungers 4 and 5 headed at 6 and subject to the action of springs 7 and arranged to be moved toward the right in Figure 1 by the movement of the steering arm 3 at right angles to the plungers. The said plungers are each arranged to cooperate with two spaced terminals 8, and by reference to Figure 1 it will be seen that one side of the source of energy 1 is connected by a wire 9 with two of the terminals 8 and that the other two terminals designated specifically by $8^x$ are connected to wires 10 and 11, respectively.

At 12 and 13 in Figure 1 are signal lamps of incandescent electric type which are designed to be used in association with appropriate means for indicating a left turn and a right turn when the lamps 12 and 13, respectively, are operated. A wire 14 leads from one side of the source of energy 1 and is connected by branch wires 15 to the filaments of the lamps 12 and 13, and the filament of the lamp 13 is also connected by a wire 16 with the filament of one of the tell tale lamps 2, and the filament of the lamp 13 is connected by a wire 17 with the filament of the other tell tale lamps 2. The filaments of the lamps 2 are connected, in turn, by wires 18 and 19 with terminals 20 and 21, respectively, Figures 1 and 3. Opposed to the terminals 20 and 21 are terminals 22 and 23, and it will be noted that the terminal 22 is connected to the before mentioned wire 10, and that the terminal 23 is connected to the before mentioned wire 11. It will also be understood that a wire 24 leads from the opposite side of the source of energy 1, with reference to the wires 14 and 9, and that the said wire 24 is connected to the windings of two solenoids 25 and 26, and that the said wire 24 is connected by branch wires 27 and 28 with the wires 10 and 11, respectively, it being noted at this point that the wires or electric connections 27 and 28 are of less resistance than the windings of the solenoids 25 and 26. The armatures of the solenoids 25 and 26 are designated by $25^x$ and $26^x$, respectively, and the inward movements of said armatures are limited by screws such as 29, Figure 3, and the armatures are connected to wheels 30 and 31, respectively, the said wheels being designed to cooperate with the terminals 20 and 21. It will also be noted that levers 32 are connected with the armatures of the solenoids, and that the said levers 32 are connected together by a bar 33, said bar 33 being pivotally connected at 34 through a hand lever 35 that is fulcrumed at 36.

The practical operation of our improvement contemplates the movement of the lever 35 in proper direction by a motorist precedent to the making of a turn, the lever 35 being swung to the left for a left turn, and said lever being swung to the right for a right turn. In Figure 3, the lever 35 is shown as moved to the proper position to signal the making of a left turn, and it will be noticed that the wheel 30 on the armature of the solenoid 25 has assumed a position by virtue of which it holds the terminal 20 in contact with the terminal 22. Under this condition, it will be manifest that current will pass from the source of energy through the wire 14 and the filament of the lamp 12 so as to cause said filament to glow, and from the said filament the current will pass through wire 16 to the appropriate tell tale lamp 2, and from said tell tale lamp 2 the current will pass through the wire 18, the terminal 20, the terminal 22, the electric connection 27 and the wire 24, back to the opposite side of the source of energy 1. Thus the left turn lamp 12 will be caused to glow and the glowing of said lamp 12 will be maintained until the turn contemplated is put into effect—i. e., until the said turn is being made, whereupon by reason of the cooperation between the steering arm 3 and the plunger 6 adjacent to the terminal 8ˣ in connection with the wire 10, the said terminal 8ˣ and the adjacent terminal 8 will be electrically connected whereupon the winding of the solenoid 25 will be energized; and the armature complementary to the solenoid 25 will be moved toward the left in Figure 3 to relieve the pressure against the terminal 20, with the result that the terminal 20 will spring away from the terminal 22 and thus the circuit including the lamp 12 and the corresponding tell tale 2 will be interrupted, and the said lamp 12 and its tell tale lamp 2 will be automatically extinguished.

From the foregoing detailed description of the operation of our improvement precedent to and incident to the making of a left turn, it is believed that the operation of the improvement precedent and incident to the making of a right turn will be readily apparent and need not therefore be set forth in detail.

We have entered into a detailed description of the construction and relative arrangement of the elements comprised in the present and preferred embodiment of our invention in order to impart a full, clear and exact understanding of the said embodiment. We do not desire, however, to be understood as limiting ourselves to the precise construction and arrangement of elements as disclosed, our invention being defined by our appended claims within the scope of which modifications may be made without departure from our invention.

Having described our invention, what we claim and desire to secure by Letters-Patent, is:—

1. An electrical organization for motor vehicles, comprising alined solenoids, the armatures of said solenoids being equipped with anti-friction rollers, levers connected with said armatures, a hand lever, a connection between the hand lever and the first-named levers, terminals, and other terminals movable by the anti-friction rollers of the armatures into engagement with the first-named terminals and this alternately.

2. The combination of alined solenoids with individual armatures, levers connected with said armatures, a hand lever, a connection between the hand lever and the first named levers, terminals, and other terminals engageable and movable by said armatures and directly engageable with the first named terminals on movement on said second named terminals by the armatures and this alternately, and movable, when released by the armatures, out of engagement with the first-named terminals.

In testimony whereof we affix our signatures.

HARVEY CURNICK.
ELSIE D. SPECHT.